United States Patent Office 3,471,024
Patented Oct. 7, 1969

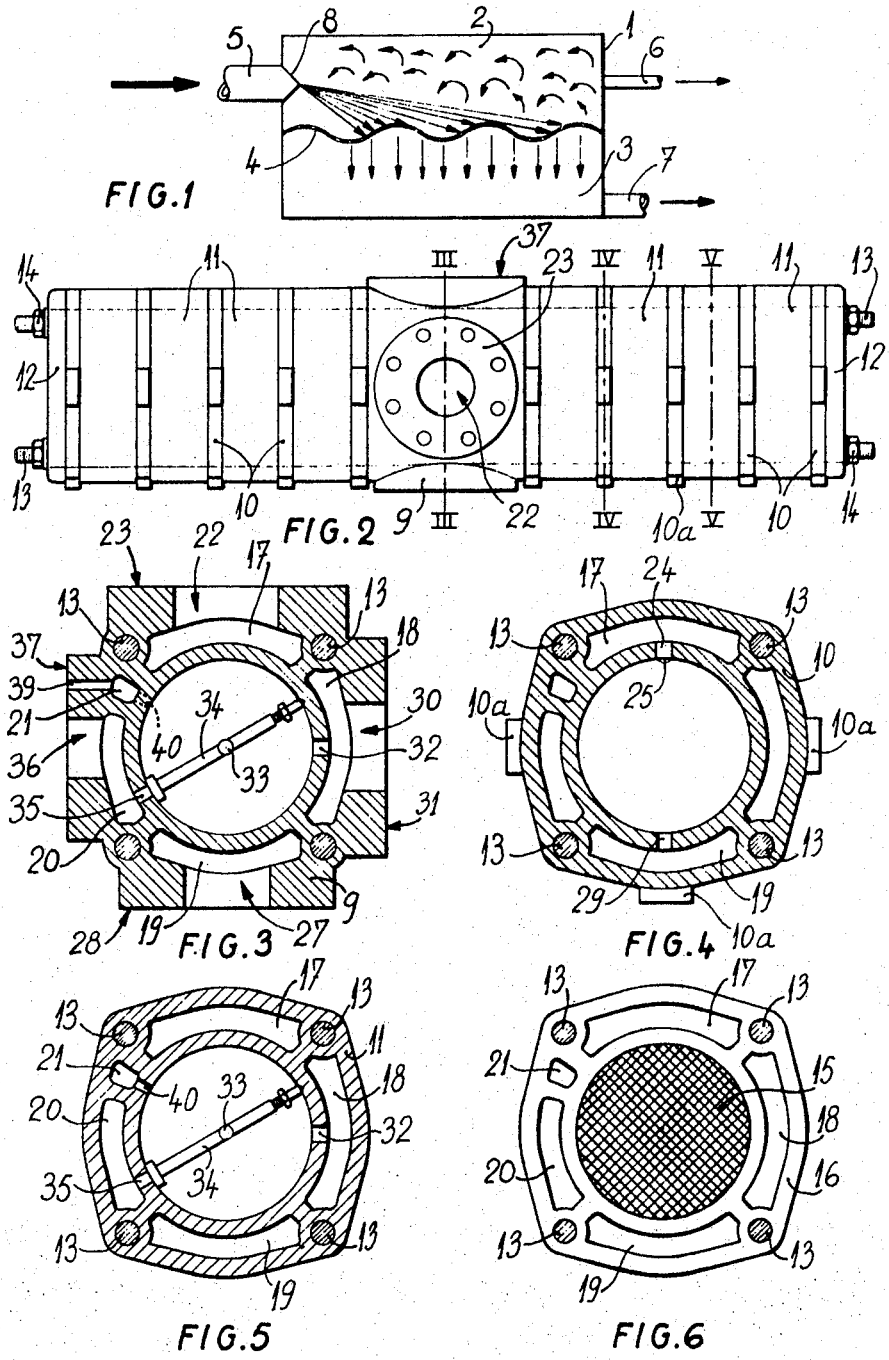

3,471,024
FILTERING APPARATUS
Charles Doucet, Geneva, Switzerland, assignor to Doucet S.A., Geneva, Switzerland, a firm of Switzerland
Filed June 28, 1965, Ser. No. 467,324
Claims priority, application Switzerland, July 1, 1964, 8,643/64; Oct. 20, 1964, 13,592/64
Int. Cl. B01d 35/22, 35/20
U.S. Cl. 210—225                              5 Claims

ABSTRACT OF THE DISCLOSURE

To provide a self-cleaning filter only part of a fluid to be filtered is passed through the filter, the fluid being used to vibrate the filter and the part not passing through the filter being used to sweep the same.

---

The present invention relates to a method for the filtration of a fluid by means of at least a filtering wall, and to a filtering installation for carrying out this method.

The filtration of liquid or gaseous fluids, by means of filtering walls, gives rise to problems the most acute of which lies in the tendency, more or less pronounced but constant, shown by the filtering walls to be obstructed and even totally clogged up.

Several solutions have been suggested for settling this question. Most generally, one effects a regeneration of the filtering walls, periodically or continuously, by means of a fluid flowing in the contrary direction.

The efficiency of the installation is thus diminished, due to the fact that a part, often important, of the filtered fluid is used for the regeneration. Moreover, the regenerating flow of fluid in the contrary direction submits the filtering walls to stresses contrary to these to which they are submitted during the filtration process, that constitutes a hard drawback so far as the strength of these walls is concerned. At last, in many cases, the regeneration requires that the process of filtration be interrupted, that reduces still further the efficiency of the installation.

The present invention has for an object to meet with these drawbacks.

The method according to the invention is characterised by the fact that the filtering wall is put into vibration so that the impurities which are eliminated from the fluid by this wall are detached therefrom, and that a part of the said fluid is let to flow through the said wall, the rest of the fluid sweeping across the said wall and stripping it from the detached impurities.

The filtering installation according to the invention is characterised by the fact that it comprises at least a receiver in which is admitted the fluid to be filtered and in which is located at least a filtering wall, means for putting this wall into vibration, and outlet means for the fluid, situated on both sides of this wall in such a way as only a part of the fluid passes through the said wall for being filtered, whereby the vibrations of the filtering wall detach therefrom the impurities which are eliminated from the part of the fluid passing therethrough, the rest of the fluid sweeping across this wall and stripping it from the detached impurities.

The drawing shows, by way of example, two embodiments of the object of the invention.

FIG. 1 is a schematical sectional view of a filtering installation illustrating the present method.

FIG. 2 is a plan view of a first embodiment of a filtering installation, so called "horizontal."

FIGS. 3 to 5 are transversal sectional views thereof, respectively along lines III—III, IV—IV and V—V of FIG. 2, at an enlarged scale.

FIG. 6 is a lateral elevational view of a detail.

Figure 7:
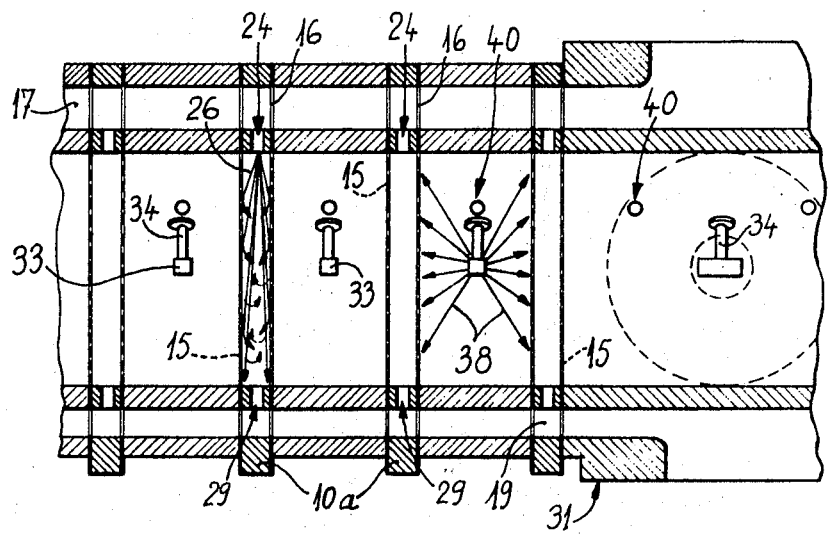
FIG. 7 is an axial and horizontal sectional view of a part of the installation, at an enlarged scale.

The installation schematically represented in FIG. 1 comprises a receiver divided in two chambers 2 and 3 by a micronic filtering wall 4. The chamber 2 is provided with two pipes 5 and 6, while the chamber 3 is provided with a pipe 7.

The fluid to be filtered is admitted into the chamber 2, under pressure, through the pipe 5 which ends in a nozzle 8 projecting it into a direction substantially parallel to the filtering wall. The impact of the fluid on the filtering wall, under a small angle of incidence and at a suitable speed, produces a dynamic effect which put the filtering wall into vibration. In order to illustrate this fact, the filtering wall 4 has been shown in FIG. 1 as being waved while it is flat at rest. (The corrugations have been magnified for increasing the clarity of the drawing.) These vibrations have for effect that the impurities retained by the filtering wall do not accumulate thereon, but are continuously detached therefrom.

Moreover, a part of the fluid to be filtered does not pass through the wall and sweeps across its outer surface. This sweeping produces a continuous stripping of the impurities retained from the filtered fluid and detached by the vibrations of the filtering wall. The filtering fluid is collected by the pipe 7 while the sweeping fluid is discharged, heavy with impurities, by the pipe 6.

The angle of incidence under which the fluid encounters the filtering wall, as well as its speed, will be chosen, in order to obtain an optimum vibration of the wall, according to the conditions of the filtering operation: Nature of the fluid, nature and density of the impurities to be eliminated, fineness of the filtering wall, etc. These conditions moreover determine the value of the part of the fluid admitted into the receiver which does not pass through the well and is discharged as sweeping fluid.

It is to be noted that, in spite of the fact that the use of the dynamic effect of the fluid to be filtered constitutes a particularly simple and neat way for putting the filtering wall into vibration, which does not need any special means therefore, such means could however be used: Thus, for instance, the putting into vibration of the wall could be effected by another fluid than the fluid to be filtered or could be ensured, among others, mechanically or by means of ultra-sounds.

The efficiency of the installation is not substantially affected by the fact that only a part of the fluid admitted in the receiver is filtered, since the sweeping fluid does not pass through the filtering wall and thus has not the opportunity of depositing thereon its impurities, contrarily to what occurs when the filter fluid is used as regenerating means for the filtering wall. Moreover, the quantity of the filtered fluid is relatively important with respect to the sweeping fluid.

In some cases, it would be useful to recycle the sweeping fluid; however, this sweeping fluid being heavy with impurities, it will be advantageous to let it pass, previously, through a decanter.

In spite of the fact that the cleaning of the filtering wall is particularly efficient, due to the vibrations of this wall which detach therefrom the impurities as soon as they are deposited thereon, thus preventing their accumulation, some clogging up of the filtering wall is not impossible, especially when the fluid to be filtered contains colloidal particles.

Thus, it is suitable to provide the installation with an auxiliary regenerating device operating periodically either automatically, controlled at steady intervals by a clock or by the increase of pressure which takes place in the inlet chamber when an eventual clogging up occurs, or manually. This regeneration is carried out by letting a fluid pass through the filtering wall in the contrary direction, this fluid being able to clear it from the impurities which have clogged it up. This contrary flow will be produced by at least one localised jet, liquid or gaseous, or both then constituting an emulsionized gas; this jet can be applied to the filtering wall either during the filtering operation, or during interruptions thereof. It is to be noted that the frequency and the duration of such regenerations are not at all comparable with these of the conventional installations and that they consume only very small quantities of fluid.

The first embodiment of the installation, illustrated in FIGS. 2 to 7, comprises a tubular horizontal receiver constituted by a central distributing element 9, which is annular and by two sets of annular elements 10 and 11, alternated in two stacks situated on both sides of the distributing element 9. The extremities of the two stacks are closed by two covers 12 preferably provided each with a checking scuttle. The whole is held together by four longitudinal rods 13 provided with tightening nuts 14.

The elements 10, narrower than the elements 11, are provided with outer extensions 10a constituting gripping means for the dismantling of the installation.

Micronic filtering discs 15, which are flat, constituted by filtering cloth or wire gauze, are located transversely in the receiver, interposed between its constituting elements. Each of these filtering discs 15 is provided with a frame 16 (FIG. 6), for instance made of compressible wired material, to which it is assembled by vulcanization, and which produces a tightening effect between the annular elements.

The several elements 9, 10 and 11 are provided with through-holes 17, 18, 19, 20 and 21, provided in their thickness. Likewise, the frames 16 are provided with corresponding apertures. These holes and apertures constitute, when associated in the stack, longitudinal passages the purpose of which is hereunder indicated.

The duct constituted by the associated holes 17 serves as an inlet pipe for the fluid to be filtered. To this effect, the distributing element 9 (FIG. 3) is provided with a radial passage 22 connecting the hole 17 with the outside, and which is intended to be connected, by means of a flange 23, to a pipe of fluid under pressure, not represented. The straight elements 10 (FIG. 4) are each provided with a port 24 connecting their hole 17 to their free central space. Each port 24 is provided with a nozzle or calibrated aperture 25 producing a multiple jet of the fluid to be filtered, indicated by the arrows 26 in FIG. 7. These jets are substantially parallel to the filtering discs 15 and produce the vibration thereof by a dynamic effect. It is to be noted that each element 10 could be provided with several ports 24 producing several jets of the fluid to be filtered.

The duct formed by the associated holes 19 of the stack constitutes a discharge pipe for the sweeping fluid. A passage 27 provided in the distributing element 9 (FIG. 3) connects the hole 19 of this latter to the outside and is intended to be connected, by means of a flange 28, to a discharging pipe of the sweeping fluid, not represented. Each narrow element 10 (FIG. 4) is provided with a port 29 connecting its free central space to the hole 19, and serving to the discharge of the sweeping fluid.

The duct constituted by the associated holes 18 of the stack serves as a collecting pipe for the filtered fluid. It communicates with the outside by a passage 30 provided in the distributing element 9 (FIG. 3). A flange 31 permits to connect this passage 30 to an outlet pipe for the filtered fluid, not represented. The wide elements 11 (FIG. 5), as well as the distributing element 9 (FIG. 3), are each provided with a port 32 connecting their hole 18 to their free central space and permitting to the filtered fluid to come into the duct constituted by the associated holes 18.

The installation as represented comprises moreover regenerating means for the filtering discs which are put into operation preferentially periodically, when the condition of obturation of the discs makes it necessary. These regenerating means are constituted by pairs of nozzles 33 situated in the center of the wide elements 11 (FIG. 5), as well as in the center of the distributing element 9 (FIG. 3). Each pair of nozzles 33 is carried by a tube 34 extending diametrically in the elements 11 and 9, closed at one of its extremities and which is connected, by its other extremity, to a port 35 provided in the elements 11 and 9, leading into the hole 20 of these elements. The distributing element 9 is moreover provided with a passage 36 connecting its hole 20 to the outside and which can be connected, by a flange 37, to a feeding pipe for the regenerating fluid, not represented. This fluid is projected, as multiple jets, onto the filtering discs 15, as indicated by the arrows 38 of FIG. 7, and thus produces the regeneration of these discs by blowing out therefrom the impurities which could have been accumulated thereon in spite of the sweeping and of the vibrations to which the discs are submitted. It is to be noted that the regenerating jets produce also a dynamic effect putting the filtering discs into vibration.

Before carrying out such a regeneration, or at the same time as this operation is effected, it is suitable to blow off entirely the installation. To this effect, compressed air, at low pressure, is sent into the duct constituted by the associated openings 21 of the stack. This duct communicates with the outside by a conduit 39 provided in the distributing element 9 (FIG. 3), which can be connected to a pipe of compressed air, not represented, by means of the flange 37. Each of the wide elements 11 (FIG. 5), as well as the distributing element 9, is provided with a port 40 connecting its hole 21 to its free central space and permitting to put under air pressure the whole receiver.

It is to be noted that the air under low pressure passes through the filtering discs in the contrary direction, like the regenerating fluid. Moreover, when this latter is a liquid, it can constitute, with the blowing off air, an emulsion which improves the cleaning of the filtering disc.

The installation comprises moreover a complex of valves ensuring its automatic or manual operation.

As a modification, the regenerating jets could be movable or "evolutive." As a modification too, the number of the elements constituting the stack could be different from this one as disclosed and represented; in the case of installations of small capacity, the receiver could even comprise only one pair of elements 10 and 11. One could likely provide installations in which a central distributing element will be provided with more than two lateral branches, for instance four or more, star arranged.

The installation is intended, as this one of the second embodiment, to be used for the filtration of liquid or gaseous fluids.

Figure 8:
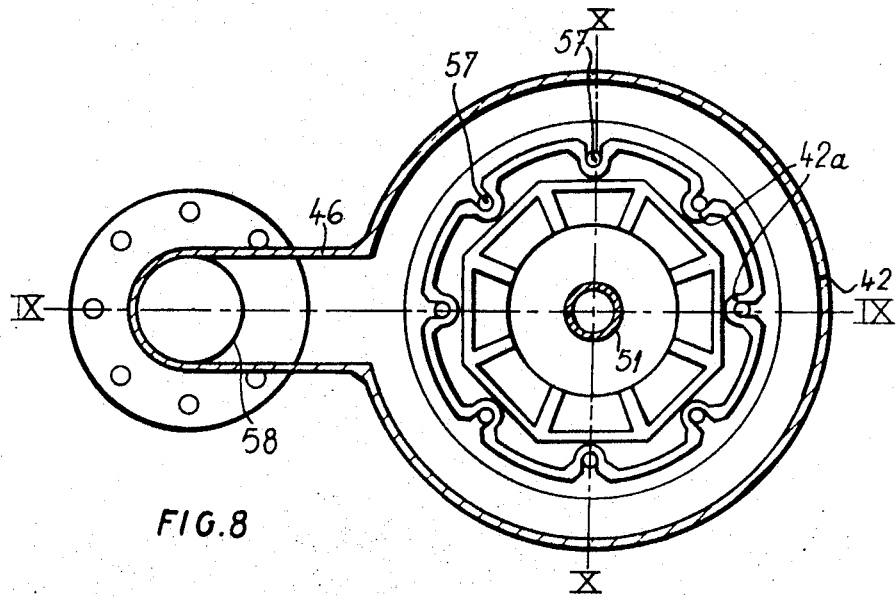
FIG. 8 is a transversal sectional view, along line VIII—VIII of FIG. 9, of a second embodiment, so called "vertical," of a filtering installation.
Figure 9:
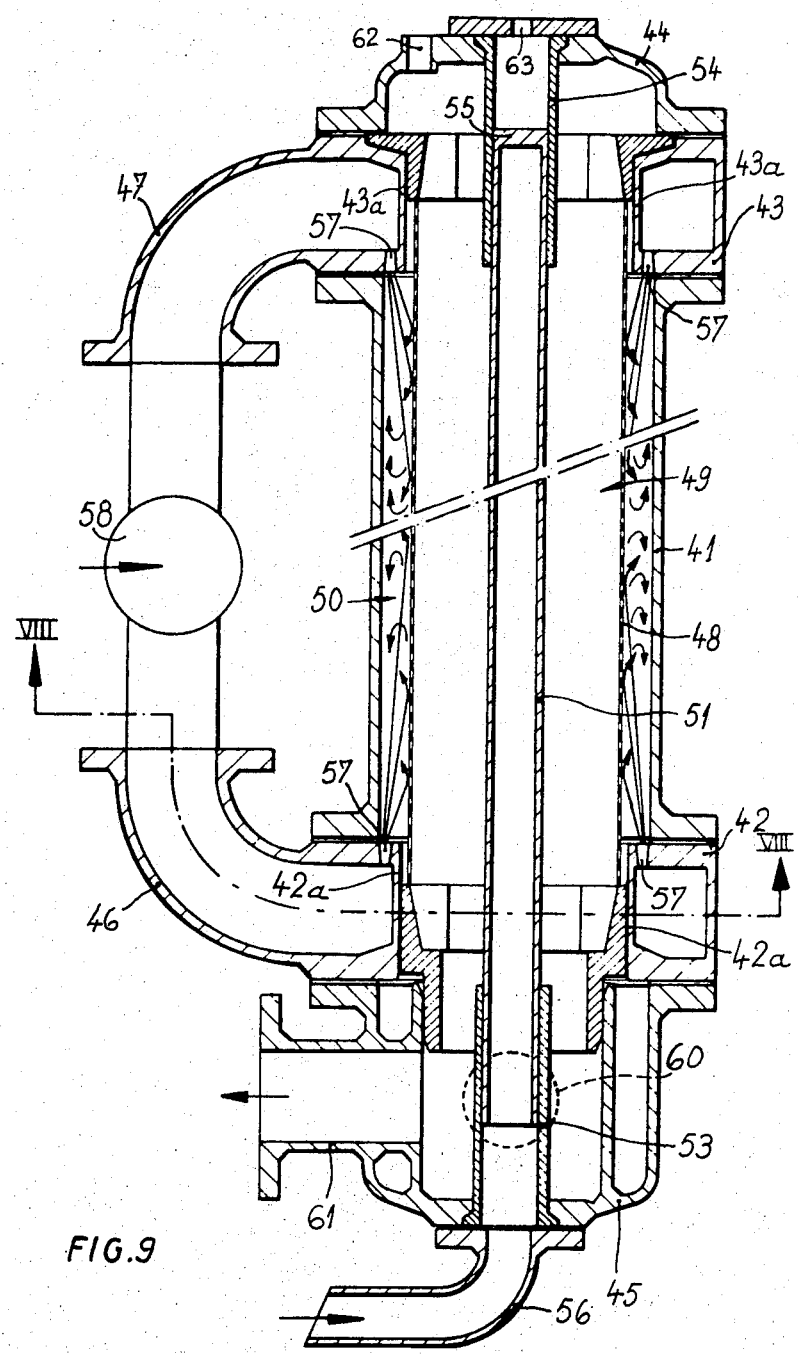
FIGS. 9 and 10 are longitudinal sectional views thereof, respectively along lines IX—IX and X—X of FIG. 8.
Figure 10:
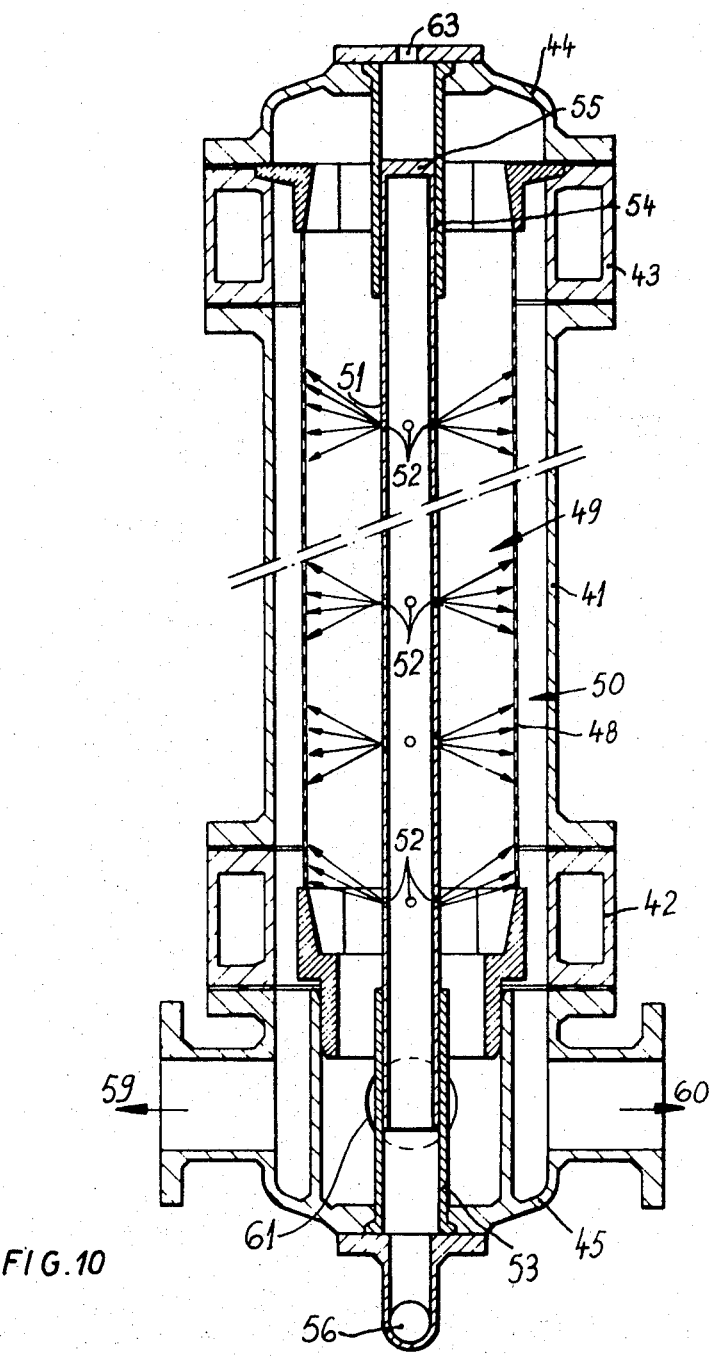

In the embodiment of FIGS. 8 to 10, the installation comprises a vertical tubular receiver at the two extremities of which are secured annular chambers 42 and 43. The chamber 43 is provided with a cover 44, while a body 45 is secured to the chamber 42. The feeding of the chambers 42 and 43 with the fluid to be filtered is ensured by pipes 46 and 47, respectively, shown in FIG. 9. Coaxially to the element 41 is mounted a micronic filtering inset 48, of tubular shape, the cross section of which is octagonal, dividing the receiver into two annular spaces 49 and 50, and a tube 51 carrying nozzles 52 looking on the space 49. The tube 51 is slidingly mounted, by one of its extremities, in a sleeve 53 secured to the body 45, and by its other extremity, in a cylinder 54 rigid with the cover 44. The upper extremity of the tube 51 is closed at 55 so as to constitute a piston displaceable in the cylinder 54. At the other extremity, the tube 51 is open and communicates with a feeding pipe 56 of the nozzles 52.

The particular shape of the chambers 42 and 43 is shown especially in FIG. 8: The inner section of these chambers is castellated, being formed with a series of ribs 42a, respectively 43a, parallel to the axis of the receiver, in which are provided calibrated apertures 57, able to give rise to jets substantially parallel to each face of the filtering inset 48, at both extremities of this latter.

The fluid to be filtered arrives by a pipe 58, which can be T-shaped, or by a distributing remote control valve, reaches the annular chambers 42 and 43, then enters into the space 50 of the receiver after having passed through the calibrated apertures 57 for the dynamic distribution. The multiple jets of the apertures 57 produce, by a dynamic effect, the vibration of the filtering inset while ensuring the sweeping across its outer surface and, thus, its continuous cleaning. Most of the fluid passes through the filtering surface and constitutes the filtered fluid collected in the annular space 49, the rest of the fluid sweeps across the filtering surface while slipping the impurities downwards, for arriving to one or the other of outlets 59 and 60, that constitutes a continuous calibrated leakage. The filtered fluid flows in the inside of the filtering inset and is collected by a pipe 61. When there are many elements or when the outlet is in load, a one-way valve is placed on the pipe 61. The delivery and the cleaning of the filtering installation thus obtained are continuous.

Moreover, the experience has shown that the filtering inset can finally become clogged up, that can happen, after several days of operation, this clogging up occurring all at once, without any advertising symptoms. It is then necessary to regenerate the filtering inset. This operation is effected either automatically, controlled for instance by the increase of pressure due to the clogging up, or periodically at will; it is very rapid, at most of one minute.

To this end, the feeding at 58 is switched off, then eventually an accelerating draining can be opened at 59 or 60, while a vent-hole 62, provided in the cover 44, ensures the inlet of air into the receiver for permitting its clearing; the air can eventually be fed under low pressure. A remote control valve allows the regenerating fluid to enter into the pipe 56 and then into the tube 51 provided with the nozzles 52. The pressure of the regenerating fluid acts on the bottom 55 of the tube and lifts it at a speed which is regulated by a calibrated aperture 63 provided in the cover 44. The regenerating fluid goes on the same way as the sweeping fluid when the installation is running and is discharged either by the calibrated leakage or by an auxiliary drainer located at 59 or at 60. The regenerating jets move upwards, acting at the same time by dynamic effect, more especially as the filtering inset is empty, and by counter flow, without producing any differential counter pressure nor an important consumption of fluid. The action of the regenerating fluid can be increased by its pressure, its temperature, eventually by a chemical effect (addition of a solvent, of an acid, etc.).

Once the cleaning is ended, the operating cycle is resumed as previously disclosed. At this time, a remote control valve produces the injection of an over pressure at 63 for pushing back downwards the jets-carrying tube 51; the vent-hole 62 permits to the air to be evacuated.

The nozzles 52 of the tube 51 could be removable; they could also be replaced by calibrated apertures provided in the thickness of the tube. These nozzles or calibrated apertures will produce jets situated in horizontal or substantially horizontal planes. The jets-carrying tube 51 could also be rotatably driven, the jets being then, preferably, situated in vertical planes.

What I claim is:

1. A filtering installation comprising at least one receiver, input means to supply to said receiver a fluid to be filtered, at least one filtering wall in said receiver, said receiver and means being cooperatively arranged to generate a dynamic effect in the fluid to produce vibration of the said wall, said wall having upstream and downstream sides and outlet means for the fluid, situated on both sides of the said wall such that part of the fluid passes through the said wall to be filtered, vibration of the filtering wall detaching therefrom impurities filtered from the part of the fluid which flows therethrough, the rest of the fluid sweeping across the said wall on the upstream side, and carrying the detached impurities out of the receiver; said receiver being constituted by a stack of annular elements arranged coaxially with respect to one another, between each of which is interposed a filtering wall, said elements being provided with holes through their thickness, arranged with respect to each other in the stack so as to constitute, together, longitudinal ducts for the fluid, said elements being of two types, alternated in the stack, one said type being provided with ports connecting their central space with two of the said holes, said ports being used respectively for the inlet of the fluid to be filtered and for the outlet of the fluid used to sweep the filtering wall, the elements of the second type being provided with at least one port connecting another of the said holes with the central space of the element and serving as the outlet for the filtered fluid.

2. An installation according to claim 1 comprising for each filtering wall, an annular frame constituting a sealing gasket between two adjacent annular elements, the said frame being provided with passages corresponding to the said holes of the said elements.

3. An installation according to claim 2, wherein said elements are each provided with a further hole constituting in the stack a duct for the passage of compressed air used for expelling fluid from the installation, the elements of the second type being provided with ports connecting the further holes to their central space.

4. An installation according to claim 2 comprising, for each element of the second type, auxiliary cleaning means for the corresponding filtering wall.

5. An installation according to claim 4, wherein said cleaning means are constituted, in each element of the second type, by central nozzles arranged for projecting a cleaning fluid onto the filtering walls, the elements of the two types being each provided with a supplementary hole constituting, in the stack, a duct for the passage of the cleaning fluid, the elements of the second type being moreover provided with ports connecting the said supplementary holes to the said central nozzles.

References Cited

UNITED STATES PATENTS

| 2,407,303 | 9/1946 | Teale | 210—433 X |
| 1,488,862 | 4/1924 | Burchenal | 210—228 X |
| 2,365,766 | 12/1944 | Levier | 210—411 X |

FOREIGN PATENTS

| 724,497 | 2/1955 | Great Britain. |

MICHAEL E. ROGERS, Primary Examiner

U.S. Cl. X.R.

55—96, 293; 210—19, 354, 411, 433